(12) United States Patent
Xu

(10) Patent No.: US 7,830,128 B2
(45) Date of Patent: Nov. 9, 2010

(54) SWITCHING REGULATOR CIRCUIT FOR OPERATION AS A SWITCHING DEVICE IN A SWITCHING MODE AND A PASSIVE DEVICE IN A PASSIVE MODE

(75) Inventor: Peng Xu, San Jose, CA (US)

(73) Assignee: Monolithic Power Systems, Inc., San Jose, CA (US)

( * ) Notice: Subject to any disclaimer, the term of this patent is extended or adjusted under 35 U.S.C. 154(b) by 152 days.

(21) Appl. No.: 12/183,643

(22) Filed: Jul. 31, 2008

(65) Prior Publication Data
US 2010/0026260 A1 Feb. 4, 2010

(51) Int. Cl.
*G05F 1/613* (2006.01)

(52) U.S. Cl. .................. 323/224; 323/282

(58) Field of Classification Search .............. 323/224, 323/282
See application file for complete search history.

(56) References Cited

U.S. PATENT DOCUMENTS 5,773,966 A * 6/1998 Steigerwald .............. 323/284
7,148,670 B2 * 12/2006 Inn et al. .................. 323/283

* cited by examiner

*Primary Examiner*—Shawn Riley
(74) *Attorney, Agent, or Firm*—Zilka-Kotab, PC

(57) ABSTRACT

A switching regulator circuit is provided for operation as a switching device in a switching mode and as a passive device in a passive mode. A controller is provided for operating the circuit in a switching mode and a passive mode. Additionally, a single transistor is provided for operating as a switching device in the switching mode and for further operating as a passive device in the passive mode.

21 Claims, 4 Drawing Sheets

SWITCHING REGULATOR CIRCUIT FOR OPERATION AS A SWITCHING DEVICE IN A SWITCHING MODE AND A PASSIVE DEVICE IN A PASSIVE MODE

FIELD OF THE INVENTION

The present invention relates to regulators, and more particularly to switching regulators.

BACKGROUND

Switching regulators operate to switch a device on and off, during use. To accomplish this, a typical switching regulator may include an output stage with upper and lower transistors (e.g. MOSFETs, etc.) having interconnected gates serving as an input and interconnected drains serving as an output. In use, such switching regulators are typically not efficient when driving light loads, particularly when the regulators are subject to heavy switching.

To make such device more efficient with light loads, a current that flows through the aforementioned output stage is conventionally reduced by implementing a low dropout (LDO) mode. During such LDO mode, the switching regulator is subjected to less switching and therefore less power is expended and efficiency is improved. While such improvements are known, there is a need for further addressing these and/or other issues associated with the prior art.

SUMMARY

A switching regulator circuit is provided for operation as a switching device in a switching mode and as a passive device in a passive mode. A controller is provided for operating die circuit in a switching mode and a passive mode. Additionally, a single transistor is provided for operating as a switching device in the switching mode and for further operating as a passive device in the passive mode.

DETAILED DESCRIPTION

Figure 1:
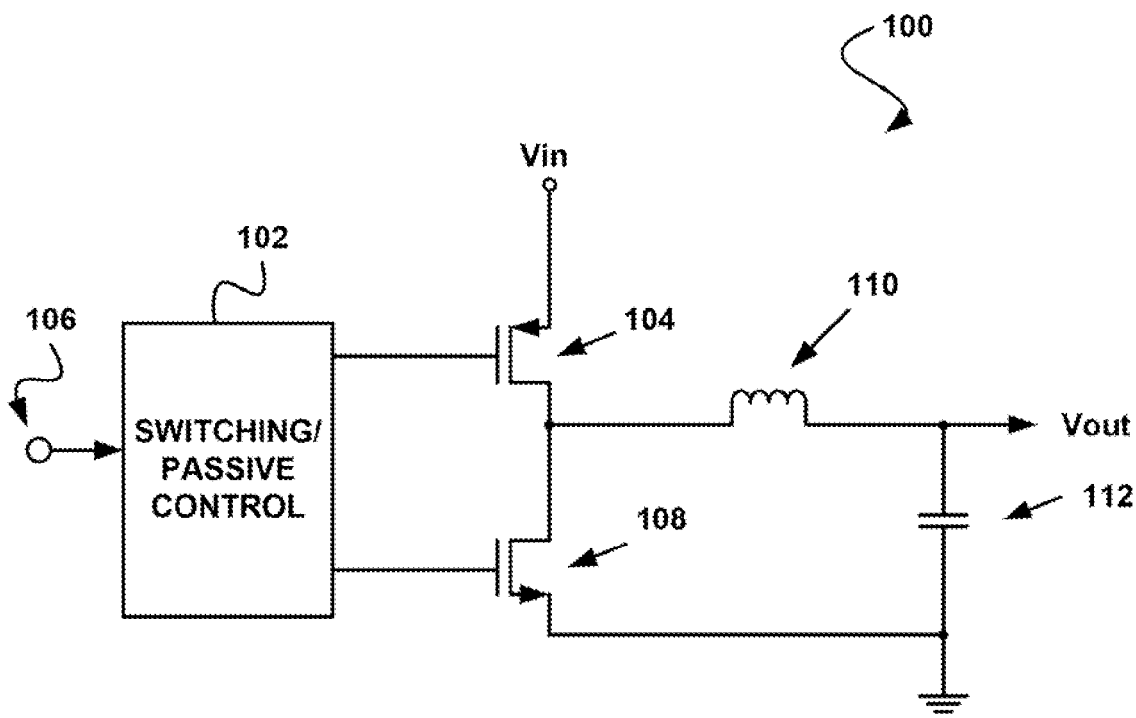
FIG. 1 shows a circuit for operation as a switching device in a switching mode and as a passive device in a passive mode, in accordance with one embodiment.

FIG. 1 shows a circuit 100 for operation as a switching device in a switching mode and as a passive device in a passive mode, in accordance with one embodiment. As shown, the circuit 100 includes a controller 102 for operating the circuit in a switching mode and a passive mode. Additionally, a single transistor 104 is provided for operating as a switching device in the switching mode and for further operating as a passive device in the passive mode. In this case, the transistor 104 may be any suitable transistor for operating as a switching and passive device. For example, in one embodiment, the transistor 104 may be a field-effect transistor (FET), such as a metal-oxide-semiconductor FET (MOSFET), etc.

In the context of the present description, a passive mode refers to any mode where the transistor 104 is functioning as a passive device. For example, in one embodiment the passive mode may be associated with a configuration where little or no load (e.g. resistant load, capacitive load, inductive load, etc.) is present in a circuit. In one embodiment, the passive mode may include a low dropout (LDO) mode.

In this case, an LDO mode refers to the any mode where a circuit functions, or is capable of functioning, as an LDO regulator. Furthermore, a switching mode refers to any mode including switching or modulation of a signal. For example, in one embodiment, the switching mode may include a pulse width modulation (PWM) mode.

As shown further, the circuit 100 may also include a synchronous switch 108, an output inductor 110, and an output capacitor 112. In operation, the controller 102 may automatically change the operation of the circuit 100 between the switching mode and the passive mode. In one embodiment, the controller 102 may automatically change the operation of the circuit 100 between the switching mode and the passive mode, based on an output 106. In this case, the output 106 may be an output from a load (e.g. a resistant load, etc.). As an option, the controller 102 may automatically change the operation of the circuit 100 between the switching mode and the passive mode, based on output current conditions.

In various embodiments, the controller 102 may include mode switching logic, and/or a voltage transducer for generating a passive mode signal. In one embodiment, the controller 102 may include one or more control modules with different control logic and/or functionality. For example, the controller 102 may represent a first control module including mode switching logic, and second control module including the voltage transducer for generating the passive mode signal.

In one embodiment, the mode switching logic may control a multiplexer (not shown) to pass a passive mode signal in the passive mode. In this case, the passive mode signal may drive the single transistor 104 to operate as a passive device. Similarly, the mode switching logic may control the multiplexer to pass a switching mode signal from a switching mode circuit in the switching mode. In this case, the switching mode signal may drive the single transistor 104 to operate as a switching device.

Further, in one embodiment, the mode switching logic may operate as a function of a feedback signal. In this case, the controller may include at least one comparator for comparing the feedback signal with a reference voltage, and the mode switching logic may operate as a function of the comparison. Of course, operating the switching logic as a function of the feedback signal is optional, as the switching logic may depend on various other signals.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
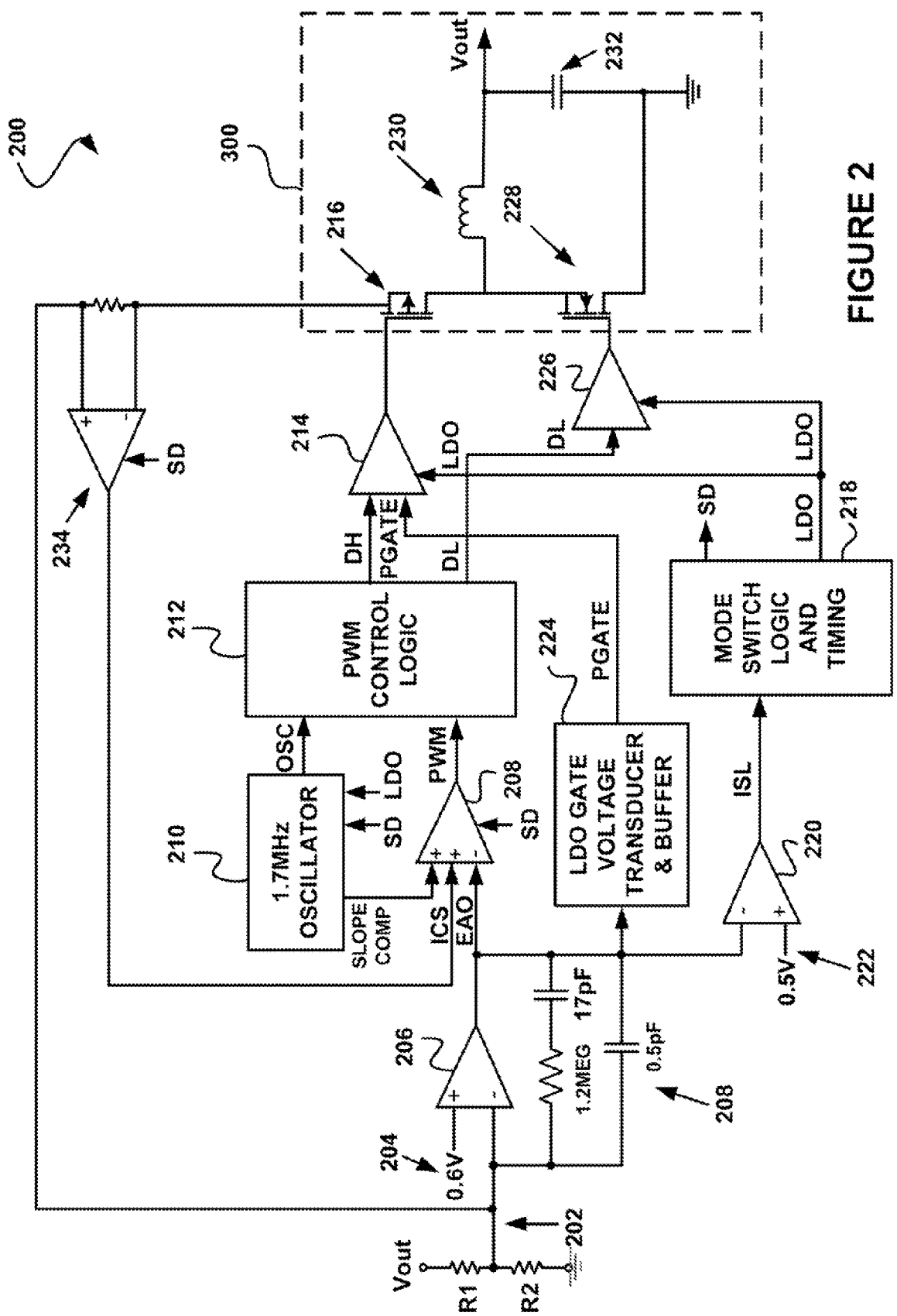
FIG. 2 shows a circuit for operation as a switching device in a switching mode and as a passive device in a passive mode, in accordance with another embodiment.

FIG. 2 shows a circuit 200 for operation as a switching device in a switching mode and as a passive device in a passive mode, in accordance with another embodiment. As an option, the circuit 200 may be viewed in the context of the functionality and architecture of FIG. 1. Of course, however, the circuit 200 may be implemented in any desired environment, it should also be noted that the aforementioned definitions may apply during the present description.

In operation, a signal 202 including a load output signal and a feedback signal is compared to a reference signal 204 using a first comparator 206. As shown, passive components 208 (e.g. resistors, capacitors, etc.) may be included in a feedback loop of the first comparator 206 for stability. It should be noted that, although the passive components 208 are illustrated with representative values (i.e. resistances and capacitances), such values may be any suitable value and may vary in different embodiments.

As shown further, an output signal EAO of the first comparator 206 servers as one input to a second comparator 208. Additionally, an amplified feedback signal ICS and a slope compensation signal SLOPE COMP serve as a second and third input, to the second comparator 208. In this case, the SLOPE COMP signal is provided by an oscillator 210.

It should be noted that, although the oscillator 210 is illustrated as a 1.7 MHz oscillator, any suitable oscillator and/or signal generator may be utilized. Further, the SLOPE COMP signal and the ICS signal are summed and compared to the EAO signal. When the sum of the SLOPE COMP signal and the ICS signal is greater than the value of the EAO signal, the second comparator 208 is triggered and a PWM signal is output from the second comparator 208.

The PWM signal then serves as a first input to PWM control logic 212. Additionally, an OSC signal serves as a second input to the PWM control logic 212. The OSC signal is a clock signal provided by the oscillator 210.

In this case, a high OSC signal will cause an output signal DH of the PWM control logic 212 to be high (i.e. a logic value of "1"). A high PWM signal will cause the DH signal to be low (i.e. a logic value of "0"). Furthermore, another output signal DL of the PWM control logic 212 is provided.

In this case, a high PWM signal will cause the output signal DL of the PWM control logic 212 to be high (i.e. a logic value of "1"). Further, a high OSC signal will cause the DL signal to be low (i.e. a logic value of "0"). It should be noted that, in some cases, the DL signal and the DH signal will have the same value. This may be caused by a delay in the signals, for example.

The DH signal serves as one input to a drive multiplexer 214. The drive multiplexer 214 serves as an input to a main transistor 216, and provides sufficient power to operate the transistor 216 (i.e. switch on and off the transistor 216). In this case, when the DH signal is high, the transistor 216 will be on, or closed. When the DH signal is low, the transistor 216 will be off, or open.

In addition to the DH signal, the drive multiplexer 214 has a second input signal PGATE and a third input signal LDO. The LDO signal is provided by mode switch and timing logic 218. In operation, the EAO signal is input into a third comparator 220. The EAO signal is then compared to a reference voltage 222.

It should be noted that, although the reference voltage 222 is illustrated as 0.5 volts, the reference voltage 222 may be any voltage and serves as a threshold for triggering the LDO signal. When the EAO drops below the reference voltage 222, a signal ISL is output to tire mode switch and timing logic 218, which in torn sets the LDO signal to a high logic value (i.e. a logic value of "1"). When the LDO signal is set to a high logic value (i.e. a logic value of "1"), the drive multiplexer 214 outputs the PGATE signal.

In this case, the PGATE signal is the EAO signal that has be input into an LDO gate voltage transducer and buffer 224. Using the LDO gate voltage transducer and buffer 224, the EAO signal is scaled and/or shifted to produce the PGATE signal which is capable of driving the main transistor 216 when the LDO signal is a high logic value. When the LDO signal is low, the drive multiplexer 214 outputs the DH signal. In this way, the LDO signal is utilized to switch between a switching mode (e.g. a PWM mode) and a passive mode (e.g. an LDO mode).

In addition to the LDO signal being output from mode switch and timing logic 218, an SD signal is output as well. The SD signal is output when the ISL signal is high (i.e. when the EAO signal drops below the threshold reference voltage 222) and servers as a shut-down signal to certain devices. For example, when the LDO mode is activated, the mode switch and timing logic 218 sends the SD signal to the second comparator 208, the oscillator 210, and a current sense amplifier 234. Thus, in LDO mode, the circuit 200 may operate efficiently by conserving power that would otherwise be expended on unused components.

As shown further, the LDO signal and the DL signal are also input to a gate driver 226. In this case, when the LDO signal is a high logic value, the gate driver 226 is disabled. By disabling the gate driver 226, a synchronous rectifier switch 228 is also disabled, or switched to off.

When the LDO signal is low, the gate driver 226 is enabled. This allows operation of the synchronous rectifier switch 228 when the LDO signal is a low logic value. In other words, the synchronous rectifier switch 228 is operational when the circuit 200 is in the PWM mode. Furthermore, the main transistor 216 functions as a switching device in PWM mode, controlled by the PWM control logic 212. In LDO mode (i.e. when the LDO signal is a high logic value), the main transistor 216 functions as a passive device.

Figure 3:
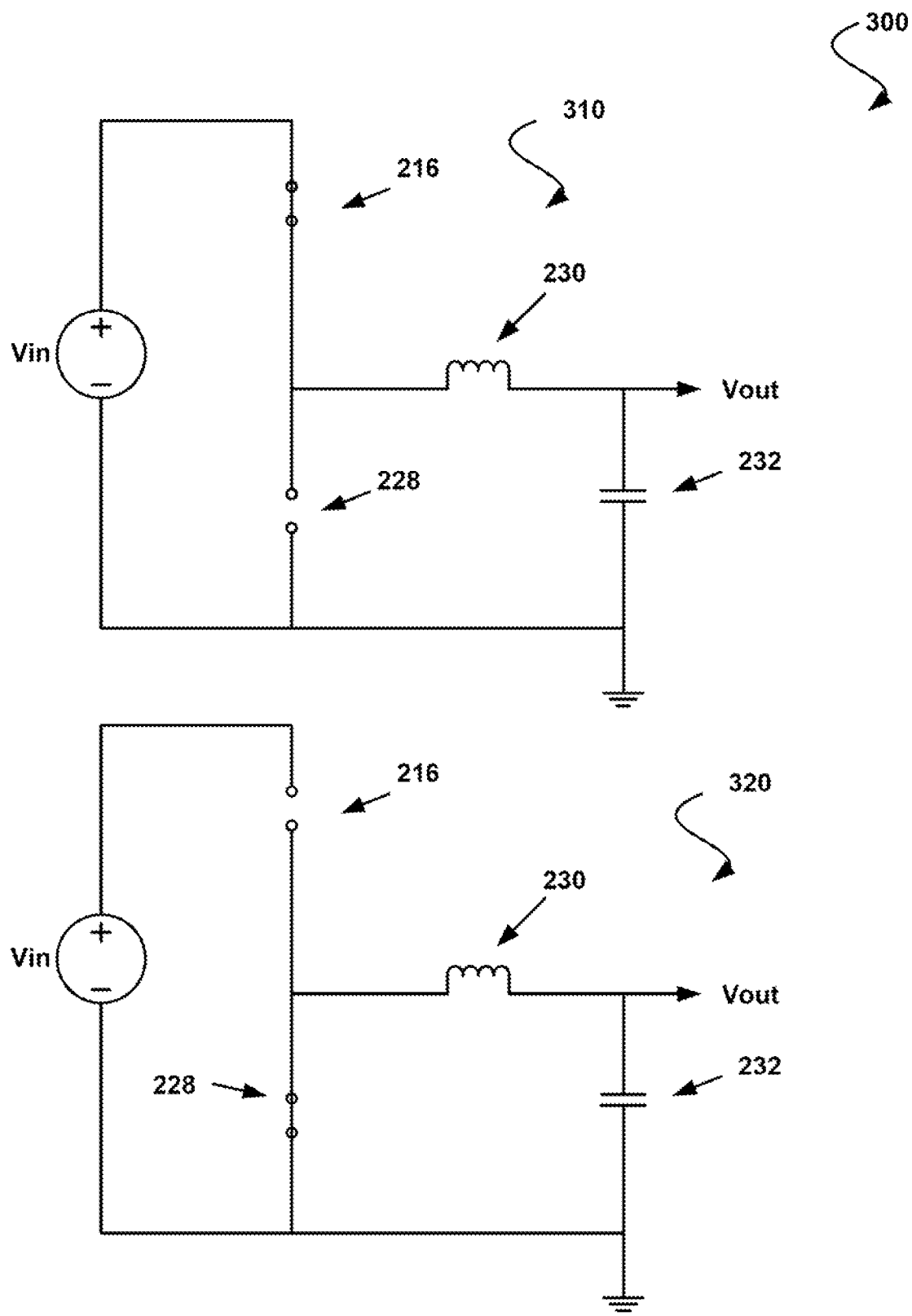
FIG. 3 shows operation of a circuit portion of FIG. 2 in a pulse width modulation (PWM) mode, in accordance with one embodiment.

FIG. 3 shows operation of a circuit portion 300 of FIG. 2 in the PWM mode, in accordance with one embodiment. As shown, when the main transistor 216 is on, the synchronous rectifier switch 228 is off (e.g. see example 310). Alternatively, when the synchronous rectifier switch 228 is on, the main transistor 216 is off (e.g. see example 320). In this case, the synchronous rectifier switch 228 is on when the DL signal output from the PWM control logic 212 is a high logic value and the LDO signal is a low logic value.

Further, FIG. 3 illustrates conditions when the PWM mode is active. In other words. FIG. 3 illustrates conditions when the EAO signal (i.e. the load/feedback signal) is above the threshold reference voltage 222, which is indicative of the presence of a "normal" load. When the EAO signal is below the threshold reference voltage 222, which is indicative of the presence of a "light" load, the LDO mode becomes active.

Figure 4:
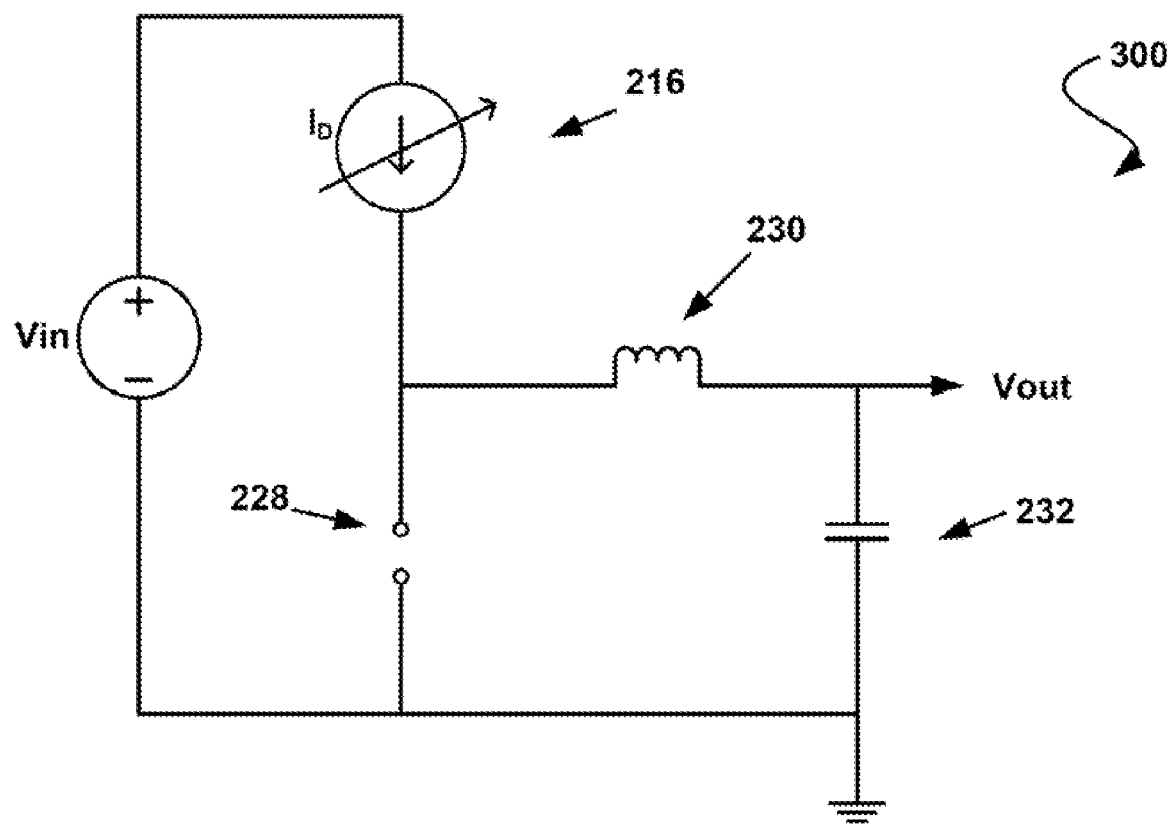
FIG. 4 shows operation of the circuit portion of FIG. 2 in a low dropout (LDO) mode, in accordance with one embodiment.

FIG. 4 shows operation of the circuit portion 300 of FIG. 2 in the LDO mode, in accordance with one embodiment. As shown, the synchronous rectifier switch 228 is off in LDO mode due to the disabling of the gate driver 226. On the other hand, the main transistor 216 is on in the LDO mode. As a result, the PGATE signal is utilized to modulate current $I_D$ flowing through the main transistor 216. In this case, the PGATE signal is modulated using the LDO gate voltage transducer and buffer 224.

As shown further, an output inductor 230 and an output capacitor 232 are included in the circuit portion 300. Such inductor 230 and capacitor 232 may be any suitable inductance and capacitance, depending on the application. Further, the inductor 230 and capacitor 232 may represent a line or system inductance and capacitance.

It should be noted that operation of the circuit 200 and the circuit portion 300 in LDO mode allows for low-quiescent-current at light load or no load conditions. Furthermore, because a disable signal (e.g. the SD signal, etc.) disables components unused at light load conditions, the circuit 200 operates efficiently, exhausting minimal power. Additionally, as shown in FIGS. 2-4, one transistor (e.g. the main transistor 216) functions as the switching device in the PWM mode as well as a passive device in LDO mode. In this way, a modulated signal (e.g. the PGATE signal) may be utilized to modulate the current (e.g. $I_D$) flowing through the signal circuit in LDO mode.

Still yet, the circuit 300 allows for automatic mode changes between the passive mode (e.g. LDO mode) and the active mode (e.g. the PWM mode), based on an output signal of a load (e.g. the EAO signal). Thus, the circuit 300 may automatically detect changes to the load and enable/disable components based on the detection.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A switching regulator circuit, comprising: a controller for operating the circuit in a switching mode and a passive mode; a single transistor for operating as a switching device in the switching mode and for further operating as a passive device in the passive mode; and a voltage transducer for generating a passive mode signal.

2. The switching regulator circuit of claim 1, wherein the controller automatically changes the operation of the circuit between the switching mode and the passive mode.

3. The switching regulator circuit of claim 2, wherein the controller automatically changes the operation of the circuit between the switching mode and the passive mode, based on an output.

4. The switching regulator circuit of claim 2, wherein the controller automatically changes the operation of the circuit between the switching mode and the passive mode, based on output current conditions.

5. The switching regulator circuit of claim 1, wherein the passive mode includes a low dropout (LDO) mode.

6. The switching regulator circuit of claim 1, wherein the switching mode includes a pulse width modulation (PWM) mode.

7. The switching regulator circuit of claim 1, wherein the controller includes mode switching logic.

8. The switching regulator circuit of claim 1, wherein the controller includes at least one multiplexer coupled to the mode switching logic and the voltage transducer.

9. The switching regulator circuit of claim 8, wherein the mode switching logic controls the multiplexer to pass a passive mode signal in the passive mode.

10. The switching regulator circuit of claim 9, wherein the passive mode signal drives the single transistor to operate as a passive device.

11. The switching regulator circuit of claim 8, wherein the mode switching logic controls the multiplexer to pass a switching mode signal from a switching mode circuit in the switching mode.

12. The switching regulator circuit of claim 7, wherein the mode switching logic operates as a function of a feedback signal.

13. The switching regulator circuit of claim 12, wherein the controller includes at least one comparator for comparing the feedback signal with a reference voltage, and the mode switching logic operates as a function of the comparison.

14. The switching regulator circuit of claim 1, wherein the transistor includes a MOSFET transistor.

15. A method, comprising: changing between a switching mode and a passive mode; and operating a single transistor as a switching device in the switching mode and further operating the single transistor as a passive device in the passive mode; wherein in the passive mode, a passive mode signal is provided by a voltage transducer for driving the single transistor to operate as a passive devie.

16. The method of claim 15, wherein the controller automatically changes the operation of the circuit between the switching mode and the passive mode.

17. The method of claim 16, wherein the controller automatically changes the operation of the circuit between the switching mode and the passive mode, based on an output.

18. The method of claim 16, wherein the controller automatically changes the operation of the circuit between the switching mode and the passive mode, based on output current conditions.

19. The method of claim 15, wherein the passive mode includes a low dropout (LDO) mode.

20. The method of claim 15, wherein the switching mode includes a pulse width modulation (PWM) mode.

21. An apparatus, comprising: a switching regulator including: a controller for operating the circuit in a switching mode and a passive mode, a single transistor for operating as a switching device in the switching mode and for further operating as a passive device in the passive mode; and a voltage transducer for generating a passive mode signal.

* * * * *